United States Patent [19]
Miyahira et al.

[11] Patent Number: 5,321,848
[45] Date of Patent: Jun. 14, 1994

[54] DRIVE-UP STATION FULL DUPLEX COMMUNICATION SYSTEM AND METHOD OF USING SAME

[75] Inventors: Harrison Y. Miyahira, Rancho Santa Fe; Elden R. Davisson, Poway, both of Calif.

[73] Assignee: H.M. Electronics, Inc., San Diego, Calif.

[21] Appl. No.: 951,863

[22] Filed: Sep. 28, 1992

[51] Int. Cl.⁵ ............................................... H04B 7/24
[52] U.S. Cl. ...................................... 455/66; 455/89; 455/90; 455/300; 379/420
[58] Field of Search ............... 455/66, 83, 89, 90, 455/78, 79, 300; 379/420; 381/76, 83, 93

[56] References Cited

U.S. PATENT DOCUMENTS

| | | |
|---|---|---|
| 3,699,271 | 10/1972 | Berkley et al. . |
| 3,944,743 | 3/1976 | Criglar et al. . |
| 4,232,318 | 11/1980 | Beacker et al. . |
| 4,392,119 | 7/1983 | Price et al. ............................ 340/38 |
| 4,584,436 | 4/1986 | Boenning et al. ..................... 179/37 |
| 4,588,859 | 11/1980 | Liberman . |
| 4,629,829 | 12/1986 | Puhl et al. . |
| 4,833,700 | 5/1989 | Seaburg . |
| 4,965,822 | 10/1990 | Williams .............................. 379/390 |
| 5,168,354 | 12/1992 | Martinez et al. ..................... 358/93 |
| 5,220,677 | 6/1993 | Brooks ............................... 455/53.1 |

Primary Examiner—Reinhard J. Eisenzopf
Assistant Examiner—Mary Man Lin
Attorney, Agent, or Firm—Bernard L. Kleinke; Jerry R. Potts

[57] ABSTRACT

The drive-up station full duplex communication system is adapted for use in a building having a drive-up vehicle lane at the outside thereof, and having a customer speaker post at the lane for enabling a customer to communicate verbally with personnel within the building to enter into a transaction. A transceiver used by personnel to communicate with a customer via a base station, is disposed within the building includes a device for attenuating a received audio signal when an outgoing audio signal is being transmitted. A customer speaker post at the drive-up station includes a device for similarly attenuating the incoming audio signal when an audio signal is being transmitted to the transceiver unit disposed within the building. Full duplex communication is achieved while substantially decreasing or eliminating unwanted feedback interference at both units.

27 Claims, 3 Drawing Sheets

DRIVE-UP STATION FULL DUPLEX COMMUNICATION SYSTEM AND METHOD OF USING SAME

DESCRIPTION

1. Technical Field

The present invention relates in general to a communication system, and a method of using it. The invention more particularly relates to a wireless audio communication system for use in drive-up businesses, such as fast food restaurants, banks, or other commercial establishments.

2. Background Art

The art of transmitting and receiving information by two-way radio or optical transmission is well known and has gained widespread recognition by drive-up businesses, such as fast food restaurants, banks and others. In a fast food restaurant, orders are placed by the customer either in person at a counter, or at a drive through lane station while remaining in the vehicle. The drive through lane is equipped with a speaker post which contains a microphone and speaker connected by wires to a base station within the restaurant, for receiving and transmitting the customer orders over either a radio link or an optical link, to several remote transceiver units used by the order taker and other personnel.

Each one of the remote units generally includes two circuit activating switches or buttons. One button enables the user to communicate exclusively with other personnel within the restaurant. The other button enables the user to communicate with the customer, with other users of the remote units being capable of listening to the communications between the customer and the order taker. Under both modes of operation, in order to listen to another party, the user of the remote unit must release the button after speaking. Similarly, the remote user must activate one of the buttons, to talk to either the customer at the customer station or to the other employees at their stations. Hence, the talk and listen process occurs sequentially rather than simultaneously. This process is referred to as a half-duplex operation.

The principal disadvantage of the half-duplex mode of operation is that the customer is usually unaware of the talk and listen process required. As a result, the customer may not realize that communication with the order taker is impossible, while the order taker is talking to the customer.

Thus, half duplex communications inherently cause a loss of audio communication from the customer to the order taker during certain periods of the dialogue between the customer and the order taker. In this regard, unwanted and undesirable miscommunications can occur, and thus an incorrect transaction can result.

For example, an order taker will ordinarily repeat back to the customer, the order just verbalized by the customer. During the repeating of the order by the order taker, the customer may speak into the customer microphone to modify the order, or to correct a mistake in the order being repeated back by the order taker. Such a simultaneous verbal communication by the customer would not be transmitted to the order taker, and thus the order taker would be totally unaware of the modification or correction, thereby resulting in an improperly completed order. As a result, the customer would not be satisfied with the completed transaction, and the transaction repeated.

Such unsuccessfully completed transactions do, of course, lead to dissatisfied customers, due to unwanted delays. In short, it is important to have accurate communications the first item, to ensure proper service for the customer.

Therefore, it would be highly desirable for the order taker to be able to talk and listen to the customer simultaneously, in a full-duplex mode of audio communication.

While a full-duplex audio system would be ideal to help overcome such problems, it has not been possible to employ a full-duplex system for use in drive-up businesses, such as fast food restaurants.

In this regard, the microphone and speaker for use by the customer would necessarily be located immediately adjacent to one another at an out-of-doors drive-up station. The customer must be able to drive up to the microphone/speaker combination, and speak into the microphone to place an order. During, the transaction, the persons may want to communicate simultaneously with one another. However, should the order taker communicate with the customer at the same time that the customer would be speaking into the customer microphone, it would pick up the voice of the order taker emanating from the customer speaker, thus creating a feedback circuit. The feedback would then produce an annoying loud noise, which would interfere with the communication between the order taker and the customer.

Additionally, conventional audio communication systems for drive-up businesses include an order taker headset unit, having a speaker and a microphone, connected electrically to a remote transceiver unit worn at the waist.

The headset unit worn by the order taker is designed to fit comfortably about the head of the order taker, allowing the order taker to move freely about, while communicating with the customer. As with the microphone/speaker unit that the customer uses to communicate with the order taker, the headset worn by the order taker has a microphone and a speaker in close proximity with one another. In a similar manner as the customer microphone/speaker unit would produce feedback, the headset unit would also be subject to feedback. The feedback in a headset would be caused by conduction along the headband from the speaker earpiece to the microphone mouthpiece.

Thus, for these reasons, full duplex audio communication for drive-up stations, has been heretofore not possible. Hence, it would be highly desirable to have a full-duplex drive-up station communication system which would overcome all of the foregoing problems.

DISCLOSURE OF INVENTION

Therefore, it is a principal object of the present invention to provide a new and improved drive-up station full-duplex communication system which is substantially free from unwanted feedback effects.

It is another object of the present invention to provide such a new and improved full-duplex communication system, which is relatively inexpensive to manufacture and convenient to use and to install.

Briefly, the above and further objects and features of the present invention are realized by providing a drive-up station communication system adapted for full duplex communication. The system can be used in businesses, such as fast food restaurants, banks, and similar commercial institutions.

The drive-up station full duplex communication system is adapted for use in a building having a drive-up vehicle lane at the outside thereof, and having a customer speaker post at the lane for enabling a customer to communicate verbally with personnel within the building to enter into a transaction. Base station includes a device for attenuating the incoming audio signal from the microphone at the speaker post when an audio signal is being transmitted to the speaker. Full duplex communication is achieved while substantially decreasing or eliminating unwanted feedback interference at both the transceiver units and at the speaker post.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
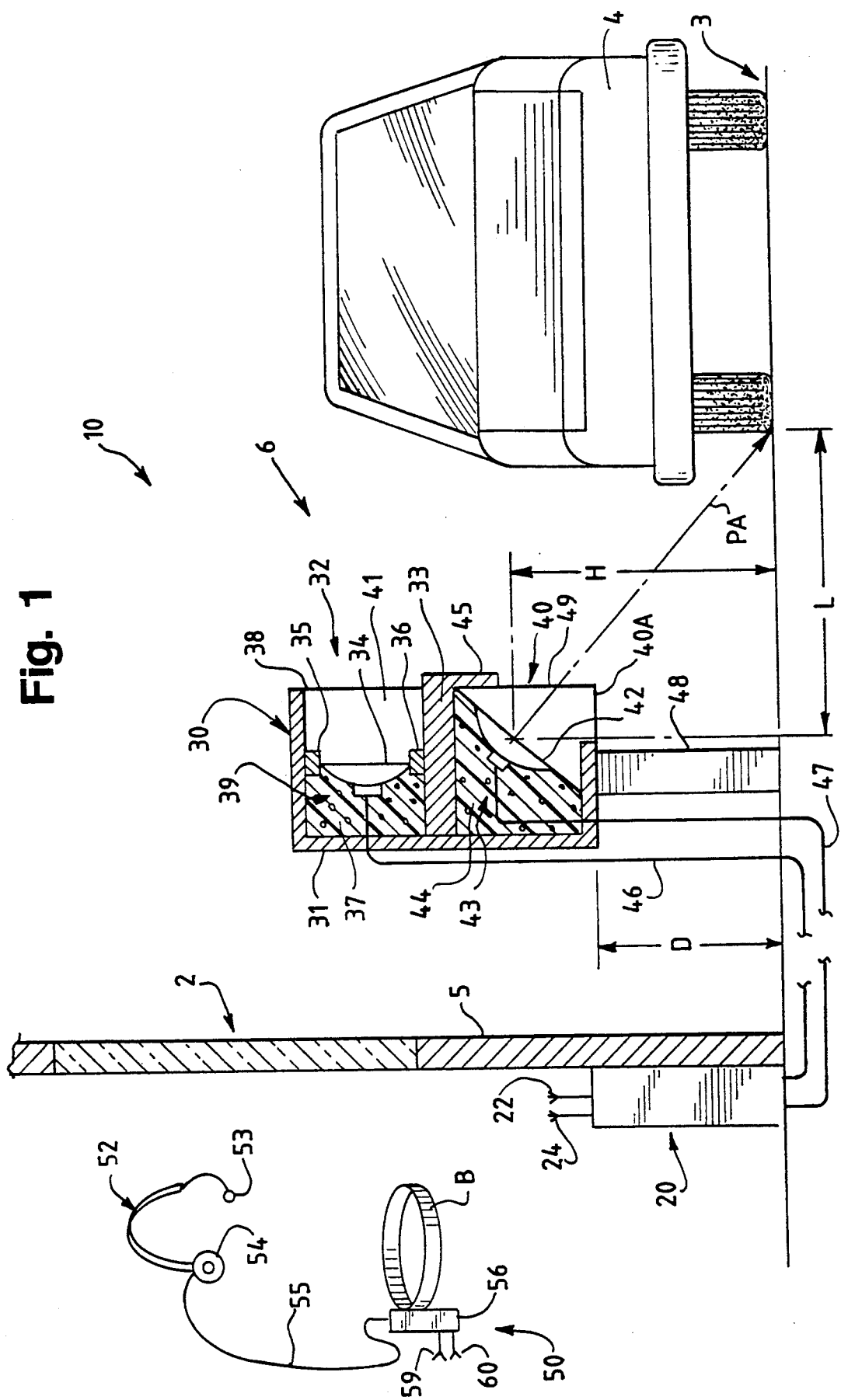
FIG. 1 is a partially broken away diagrammatic view of a drive-up station full duplex communication system, which is constructed in accordance with the present invention.

Referring to the drawings and more particularly to FIG. 1 thereof, there is illustrated a drive-up station full duplex wireless communication system 10, which is constructed in accordance with the present invention, and which is illustrated for use in a drive through establishment, such as a fast food restaurant, bank, or similar institution. In this regard, while the inventive system is shown and described herein as used in connection with a fast food restaurant, it will become apparent to those skilled in the art that the inventive system may also be used for various different types and kinds of businesses and other establishments employing drive-up stations The fast food restaurant includes a conventional service facility or building 2 where food and beverage products are prepared and a distant drive through station 6. The building 2 includes a wall 5 having a window 5A, and is disposed adjacent to a vehicle drive through lane 3 for accommodating motor vehicles, such as an automobile 4.

The system 10 generally includes a remote customer speaker post 30 forming a drive-up station, for enabling two way full duplex communications between a customer (not shown) seated in vehicle 4 and a remote transceiver unit, such as the remote transceiver unit 50 worn by an order taker (not shown) within the building 2. A single base station unit 20 couples the full duplex communications between the remote speaker post 30 and the remote transceiver unit 50.

While only one remote transceiver unit 50 is shown for illustration purposes, it will become clear to those skilled in the art that many more remote transceiver units may also be used.

Considering now the remote customer speaker post unit 30 with reference to FIG. 1, the remote customer speaker post forming a drive-up station, includes a microphone/speaker housing 31 having three separated compartments or enclosures, a microphone enclosure 32, a speaker enclosure 40, and an acoustic damping compartment 33 interposed between the microphone enclosure 32 and the speaker enclosure 40 to acoustically isolate them from one another. The housing 31 is supported above the ground a sufficient distance D by a post 48 for helping facilitate two way communication with the driver of the vehicle 4, as will be explained hereinafter A speaker used as a microphone 34 is mounted within the microphone enclosure 32, for enabling the driver of the vehicle 4 to communicate verbally with the employee or employees wearing the remote transceiver units, such as the transceiver unit 50. In this regard, the microphone 34 is electrically connected to the base station 20 by electrical cable 46 so that the communications from the driver can be transmitted over the air to the transceiver unit 50. The microphone 34 is mounted within the enclosure 32 to separate the microphone enclosure 32 into two approximately equivalent spaces. An inner space 39 and an outer space 41. The microphone 34 is secured within microphone enclosure 32 by four shock mounts such as mounts 35 and 36 respectively for helping to reduce mechanical coupling from the speaker enclosure 40. A sound absorbent material 37 fills the inner space 39 to further reduce mechanical coupling from the speaker enclosure 40.

A speaker 42 is mounted within the speaker enclosure 40, for enabling the driver of the vehicle 4 to receive verbal communications from the employees wearing the remote transceiver units, such as the transceiver unit 50. In this regard, the speaker 44 is electrically connected to the base station 20 by an electrical cable 47 so that communications 44. The speaker 42 is mounted at an angle of about 30°, from the vertical, forming an open frontal opening 49 in front of the speaker 42 and an irregular shaped inner space 43 behind the speaker 42. A sound absorbent material 44 fills the inner space 43 for helping to provide acoustic isolation from the speaker 42.

To direct the sound emanating from speaker 42, enclosure 40 has a cut-away portion 40A and a baffle 45. Cut-away portion 40A is recessed from frontal opening 49 a sufficient distance to permit the sound from speaker 42 to exit enclosure 40. A baffle 45 is secured to an outer wall of the acoustic damping compartment 33 and extends downwardly to partially obstruct frontal opening 49 of the speaker compartment 40. In this regard, the baffle 45 helps direct the sounds from the speaker 42 downwardly and away from the microphone 34.

Figure 3:
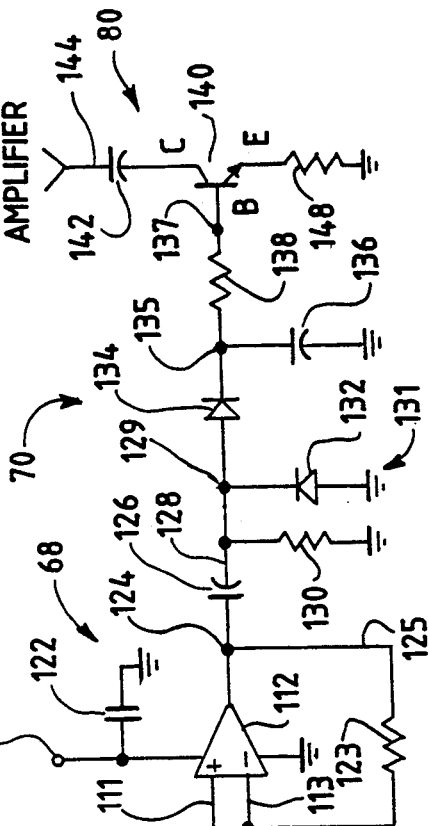
FIG. 3 is a distance vs. height diagram showing the distance to a motor vehicle relative to the height and angle of inclination of a speaker in the remote customer speaker post of FIG. 1 in accordance with the present invention.

Considering now the speaker 42 with reference to FIGS. 1 and 3, in order to help prevent the sound from speaker 42 from feeding back into the microphone 34 off of a vehicle disposed in the approach lane 3, such as the vehicle 4, the speaker 42 is inclined downwardly with its focal point P located at a height H from the ground. According to the invention the speaker height H is between about 3 feet and about 4.5 feet. A more preferred height H is between about 3 feet and about 3.75 feet. The most preferred height H is about 3 feet.

As best seen in FIG. 3, the principal axis PA of the outbound audio is directed downwardly from the focal point P of the speaker 42 toward the ground at an angle $\theta$ so that the principal axis intersects the ground at a horizontal distance L from an imaginary line IM (FIG. 3) extending downwardly from the focal point P intersecting the ground at about 90°. Thus, the greatest concentration of sound from speaker 42 contained in a cone of radiation is directed towards the ground and not to the vehicle 4 to eliminate or greatly reduce the amount of feedback to microphone 34. The angle $\theta$ is preferably between about 20° and about 40°. A more preferred angle $\theta$ is between about 25° and about 35°. The most preferred angle $\theta$ is about 30°.

Based on the relationship between the principal axis PA and the imaginary line IM, the distance L between the speaker post and the vehicle position is preferably between about 2 feet and about 5 feet. A more preferred distance L is between about 3 feet and about 4 feet. The most preferred distance L is about 3.5 feet.

As best seen in FIG. 3, the angle $\theta$ can be expressed by the following equation:

$$180° = \theta + \gamma + \phi \quad (1)$$

Thus, in the preferred form of the invention, when $\theta$ is about 30°, $\phi$ is about 60° and $\gamma$ is about 90°.

Figure 6:
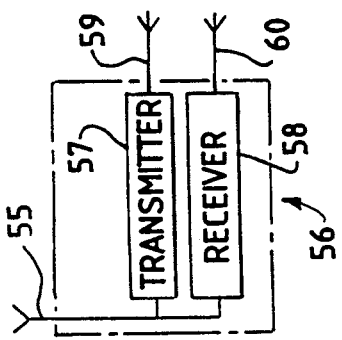
FIG. 6 is a block diagram of a remote transmitter/receiver unit.

Considering now the remote transceiver unit 50 with reference to FIG. 1, the remote transceiver unit 50 includes a headset 52 having a microphone 53 and a speaker 54 for facilitating communication by the user. A remote transmitter/receiver unit 56 worn on a belt B of the user, is connected electrically to the headset 56 by a cable 55 and couples electrical transmission signals to and from the driver of the vehicle 4 via the base station 20. In greater detail with reference to FIG. 6, the remote transmitter/receiver 56 generally includes a transmitter 57 for transmitting message signals to base station 20 and a receiver 58 for receiving messages from the base station 20. A pair of antennas 59 and 60 permits transmission signal to be coupled to the transmitter 57 and receiver 58 respectively. From the foregoing, it will be understood the remote transmitter/receiver unit 56 permits communication with the base station 20 by means of a transmitter 57 and a receiver 58 integrally connected to the remote transmitter/receiver unit 56.

Figure 2:
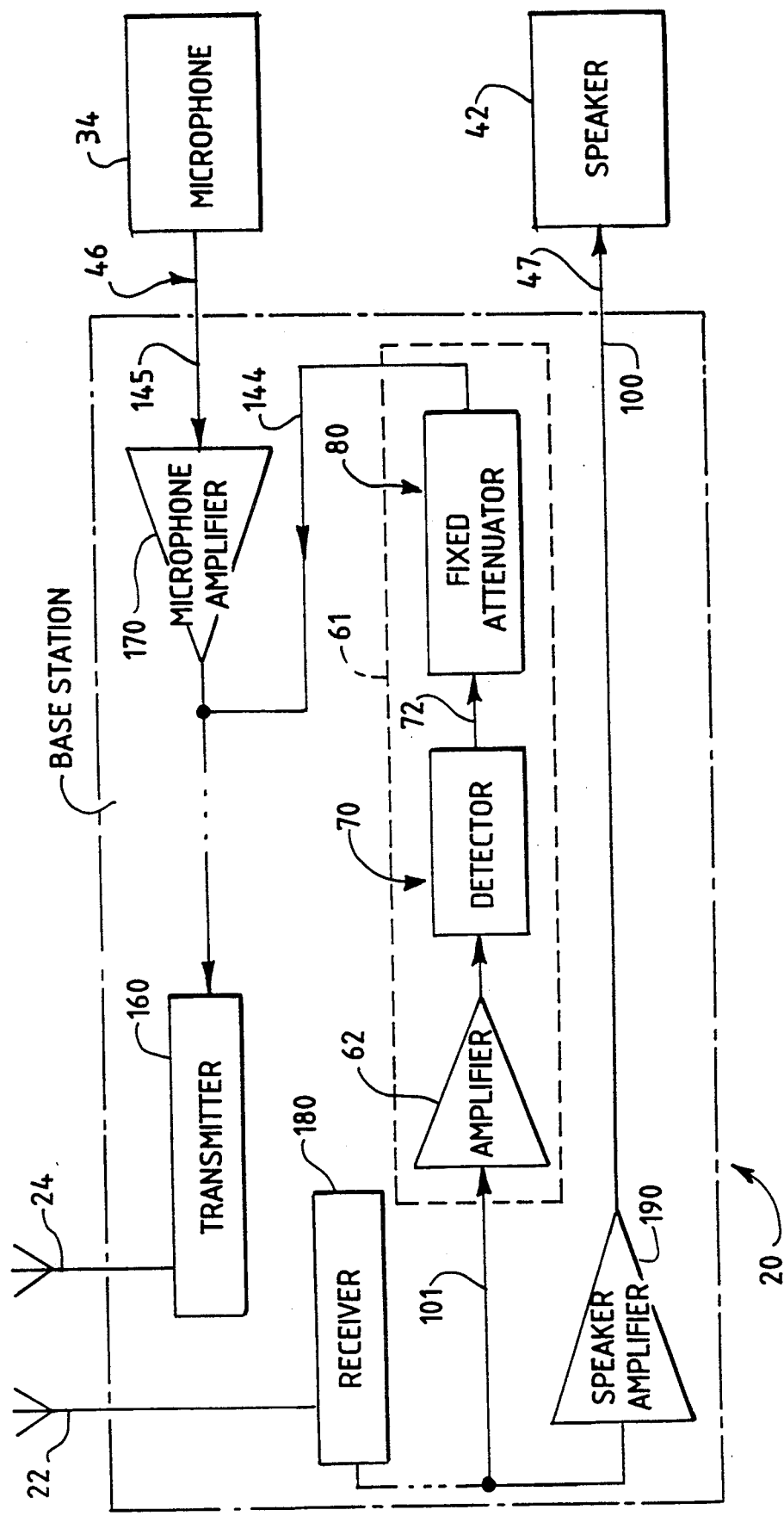
FIG. 2 is a block diagram of the base station of the system of FIG. 1.

Considering now the base station 20 in greater detail with reference to FIGS. 1 and 2, the base station 20 generally includes an audio output 100 disposed between an electrical cable 47 and a speaker amplifier 190 to permit an outbound base station audio signal to reach the remote customer speaker post unit 30. Audio signal circuitry (not shown) is disposed between the input of speaker amplifier 190 and receiver 180 to convert an RF signal received by wireless means to an analog audio signal. Receiver 180 receives an inbound remote unit RF signal through antenna 22 attached to receiver 180 and inputs the audio signal detected into the audio signal circuitry (not shown). An antenna 24 is connected to the output of transmitter 160 to send outbound base station RF signals to the remote transmitter/receiver unit 56. Audio signal circuitry (not shown) is disposed between the input of transmitter 160 and microphone amplifier 170 to convert an analog audio signal to a form suitable for wireless transmission. Input line 145 is connected between the input of microphone amplifier 170 and electrical cable 46 permitting an inbound audio signal from microphone 34 to be input into microphone amplifier 170.

The base station unit 20 also includes an audio gain reduction circuit 61 for sampling the outbound audio signals from the base station unit 20 to the remote speaker post 30 and for attenuating the inbound audio signals from the remote speaker post 30 to the base station unit 20 as described hereinafter in greater detail.

Figure 4:
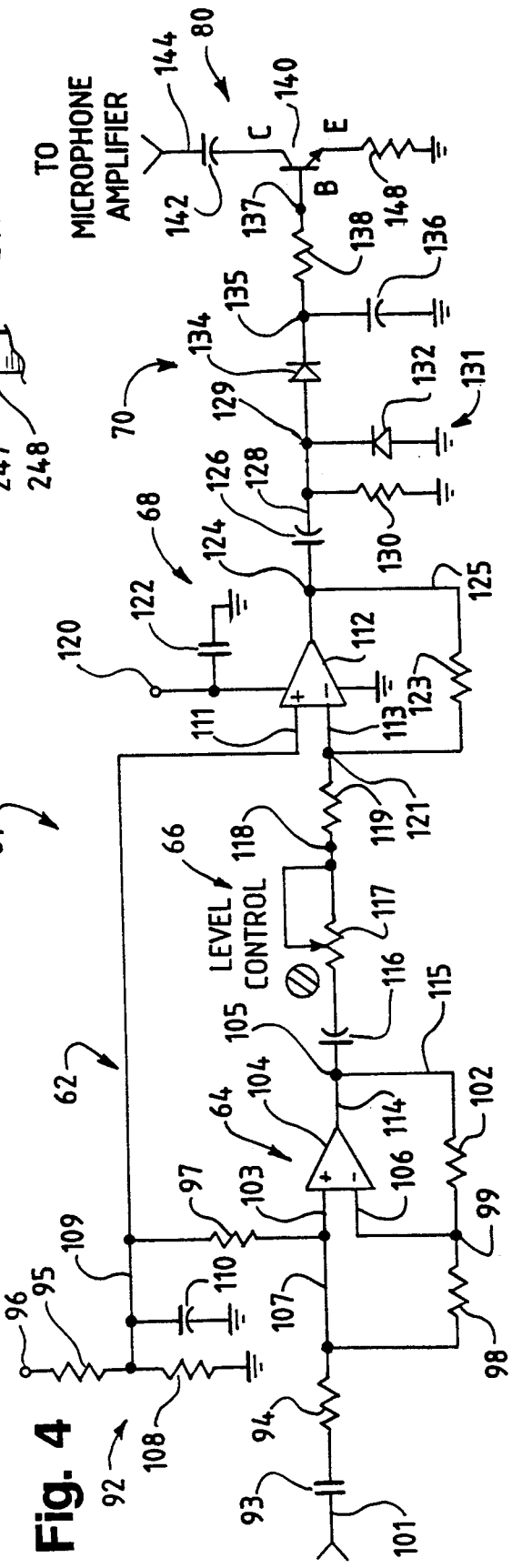
FIG. 4 is a schematic circuit diagram of the audio gain reduction system of the base station of FIG. 2.

Considering now the 4, audio-gain reduction circuit 61 with reference to FIG. 4, the audio gain reduction circuit 60 generally includes a fixed attenuator unit 80 having its output coupled to the base station transmitter 160 modulation input. The attenuator unit 80 adjusts or attenuates the inbound audio signals received from the remote customer speaker post 30 in the presence of outbound audio at the speaker 42. Reduction circuit 61 also includes a detector circuit 70 coupled to the input of the fixed attenuator 80 via a conductor 72. The detector circuit 70 detects the presence of outbound audio when the remote transceiver 56 is being used by the order taker to talk to the customer.

In order to amplify the outbound audio signal, received by receiver 180 from the remote transceiver 56, the reduction circuit 61 also includes an amplifier 62 having its output connected to the detector 70. The amplifier 62 increases the strength of the audio signal received from the remote transceiver 56. In this regard, the input of amplifier 62 is coupled to the receiver 180 via the input of speaker amplifier 190 via a conductor 101.

Considering now the fixed attenuator 80 in greater detail with reference to FIG. 4, the fixed attenuator 80 generally includes a PN2222 transistor 140 having its collector C coupled to the microphone amplifier 170 output via a 10μ capacitor 142. The emitter E of transistor 140 is coupled to ground via a 15Ω resistor 148 which provides a conduction path from the collector C to the emitter E when an input signal is received from the detector circuit 70 via the base B of the transistor 140. In this regard, the base B of transistor 140 is connected to the output of the detector circuit 70 via a 10K input resistor 138. A common input node 135 is disposed between the output of detector circuit 70 and the resistor 138.

In operation, the fixed attenuator 80 acts as a switch to limit the audio signal received from microphone 34 to a predetermined level before being input into the transmitter 160.

Considering now the detector circuit 70 in greater detail with reference to FIG. 4, the detector circuit 70 generally includes a 22 μf capacitor 136 coupled between ground and the common node 135. Node 135 is further connected to the cathode of an IN270 diode 134. In this regard, the diode 134 will conduct an electrical signal to the input of the fixed attenuator 80 while capacitor 136 is charging. The combination of resistor 130, diode 132, and diode 134 is configured as a standard voltage doubler circuit.

The resistor 130 and diode 132 are connected in parallel between an input common node 129 and ground. The input node 129 is disposed between the anode of diode 134 and a 1.0 μf coupling capacitor 126 connecting the output of the amplifier 62 to the input of the detector circuit 70.

In operation, when an input audio signal is received by the detection circuit 70 via the capacitor 126, the capacitor 136 is charged during a half cycle of the input signal after passing through diode 134. When the voltage across capacitor 136 becomes sufficient to turn on transistor 140, the audio signal present at the output of microphone amplifier 170 will be shunted to ground attenuating the audio input from the microphone 34.

Considering now the amplifier 62 in greater detail with reference to FIG. 4, the amplifier 62 generally includes an operational amplifier circuit 64 for amplifying the input signal received from the input to the speaker amplifier 190 and a level control circuit 66 for controlling the level of the input signal coupled to the operational amplifier circuit 68.

As best seen in FIG. 4, the operational amplifier circuit 68 includes an LM353 operational amplifier 112 whose output is connected to the detector circuit 70 at node 124, a feedback circuit 125 with a 100K resistor 123 in series connecting node 124 and a node 121. Common to node 121 is an inverting terminal 113 of operational amplifier 112 and 10K input resistor 119 which connects the level control circuit 66 to the operational amplifier circuit 68. A non-inverting terminal 111 of operational amplifier 112 is connected to a node 109 of operational amplifier circuit 64, allowing the output of operational amplifier 112 to be varied according to the relative inputs at inverting terminal 113 and non-inverting terminal 111. A +12V voltage source 120 is connected between operational amplifier 112 and ground with 0.1 $\mu$ f capacitor 122 connected in parallel to bypass for RF fields.

In operation, the output of operational amplifier 112 is increased or decreased according to the average level present at the speaker amplifier 190 input necessary to turn on attenuator switch transistor 140. Some of the output is then fed back from node 124 to the inverting terminal 113 through 100K resistor 123 to set the gain. The output from node 129 which is not fed back to the inverting terminal 113 is supplied to capacitor 126 of detector unit 70.

The level control circuit 66 generally includes A 10K resistor 119 connected between node 121 of operational amplifier circuit 68 and a node 118. A 100K variable resistor 117 is connected to node 118 and is in series with a 1 $\mu$ f non polar capacitor 116 to vary the signal that passes from capacitor 116 to resistor 119.

In operation, the variable resistor 117 may be increased or decreased to decrease or increase, respectively, the signal that the level control circuit 66 supplies to amplifier circuit 68.

As best seen in FIG. 4, the operational amplifier circuit 64 includes an LM353 operational amplifier having as inputs an inverting terminal 106, a non-inverting terminal 103, and an output connected to a node 105. Node 105 connects operational amplifier circuit 64 to capacitor 116 of level control circuit 66. A feedback circuit 115 includes a 1M resistor 102 connected between node 105 and a node 99. Node 99 is connected to inverting terminal 106 to complete feedback circuit 115. A 10K resistor 98 is disposed between node 99 and a node 107. Node 107 is connected to a non-inverting terminal 103 of operational amplifier 104 for comparison with the input to inverting terminal 106.

A 100K resistor 94 in series with a 0.1 $\mu$ f capacitor 93 are connected between node 107 and speaker amplifier 190 input by conductor 101 to provide a sample of the outbound audio signal for the audio gain reduction circuit 61. Connected between node 107 and a node 109 is a 1M resistor 97. Node 109 is connected to non-inverting terminal 111 of operational amplifier 112, supplying a signal for comparing with the signal at inverting terminal 113. To provide a reference voltage to node 109 for input to the non-inverting terminals 103 and 111, a 10K resistor 95 is connected between node 109 and a +12V voltage source 96. The signal at node 109 is then filtered by filter circuit 92. Filter circuit 92 comprises the combination of 10K resistor 108 and 100 $\mu$ f capacitor 110 connected, in parallel, between node 9 and ground.

In operation, an outbound audio signal is sampled by operational amplifier circuit 64 through conductor 101. This sample is summed with a voltage source 96 which has been filtered and is then input into the non-inverting terminal 103 of operational amplifier 104. Part of the sampled signal is then input into the inverting terminal 106 of operational amplifier 104. The operational amplifier 104 then produces an output to the level control circuit 66 based on the difference between the signals input to non-inverting terminal 103 and inverting terminal 106. Feedback circuit 115 then returns some of the output signal to the inverting terminal 106 to produce the required gain action. The filtered voltage source signal at node 109 is simultaneously input to the non-inverting terminal 111 of operational amplifier 112, providing a signal to compare with the inverting terminal input of operational amplifier circuit 68.

Figure 5:
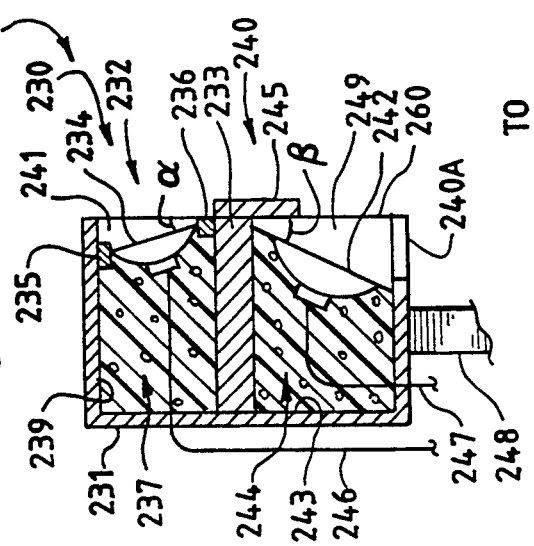
FIG. 5 is a sectional elevational view of another full duplex communication system which is also constructed in accordance to the present invention.

Referring now to the drawings, and more particularly to FIG. 5 thereof, there is shown another drive-up station full duplex communication system 200 which is constructed in accordance to the present invention. The system 200 is similar to the system 10, except for the construction and arrangement of the customer speaker post (the other portions of the system being omitted from the drawings).

The system 200 generally includes a drive-up customer speaker post unit 230. The unit 230 operates in a similar manner as the unit 30 of the system 10.

Considering now the customer communication unit 230 in greater detail with reference to FIG. 5, the communication unit 230 includes a housing 231 supported from below by a post 248 mounted in the ground. The housing 231 includes three separate compartments or enclosures, a microphone enclosure 232, a speaker enclosure 240, and an acoustic damping compartment 233 interposed between the microphone enclosure 232 and the speaker enclosure 240 to acoustically isolate them from one another. The housing 231 is supported above the ground a sufficient distance D by the post 248 for helping to facilitate two way communications with the driver of a vehicle (not shown) in an approach line adjacent to the speaker post 230.

The remote customer speaker post 230 also includes a speaker 242 mounted within the speaker enclosure 240 for enabling a driver of the vehicle to receive communications from the remote transceiver unit 250 via the base station 230, and a microphone 234 mounted within the microphone enclosure 232 for enabling the driver of the vehicle to communicate with an employee of the service establishment via the base station 230 to the remote transceiver unit 250.

Considering now the microphone enclosure 232 in greater detail, the microphone enclosure 232 includes a closed inner or back compartment 239 and an open outer or front compartment 241. The microphone 234 is disposed between the back and front compartments 239 and 241 respectively and is mounted within the microphone compartment 232 by four shock absorbing mounts such as mounts 235 and 236.

In order to help prevent feedback into the microphone 234 from the speaker 242, the microphone 234 is mounted with its top portion inclined rearwardly from the vertical by an angle α. The angle α is preferably between about 10 degrees and about 20 degrees. A more preferred angle α is between about 12 degrees and about 18 degrees. The most preferred angle α is about 15 degrees.

To further help reduce mechanical vibrations from causing sounds to be picked up by the microphone 234, the inner compartment 230 is filled with a sound absorbent material 237.

The speaker enclosure 240 includes a closed inner or rear compartment 243 and an open outer or forward portion 249. The inner compartment 243 is filled with a sound absorbent material 244 for helping to reduce mechanical vibrations from being coupled to the microphone 234. The speaker 242 is mounted in the speaker enclosure 240 with its lower portion disposed further inwardly than its upper portion. In this regard, the speaker is mounted at an angle β relative to the vertical for helping to reduce feedback into the microphone 234. The angle β is preferably between about 20° and about 40°. A more preferred angle β is between about 25° and about 35°. The most preferred angle β is about 30°.

To direct the sound emanating from speaker 242, enclosure 240 has a cut-away portion 240A and a baffle 245. Cut-away portion 240A is recessed from a frontal opening portion 260 of speaker enclosure 240 a sufficient distance to permit the sound from speaker 242 to exit enclosure 240.

A baffle 245 is secured to the outer surface of the acoustic damping compartment 233 for helping to reduce feedback into the microphone 234. In this regard, the baffle 245 extends downwardly to partially block a front portion 260 of the outer opening 249.

Those skilled in the art will understand the speaker 242 is mounted in a manner similar to the mounting of speaker 42 in order to prevent sounds from bouncing off the vehicle and back into the microphone 234.

As best seen in FIG. 5, the microphone 234 and the speaker 242 are connected electrically to the base station 20 by a pair of conductor cables 246 and 247 respectively.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A drive-up station full duplex communication system for communications between an employee within a building and a customer seated within a vehicle in a drive-up lane at a drive-up customer speaker post, outside of the building, comprising:

employee transceiving means for transmitting a first audio signal and for receiving a second audio signal;

a base station transceiving means to receive said first audio signal and a third audio signal and to transmit said second audio signal and a fourth audio signal;

audio gain reduction means to decrease said second audio signal;

fixed remote communication means mounted to the drive-up customer speaker post to transmit said third audio signal and receive said fourth audio signal said fixed remote communication means including a microphone compartment having a microphone disposed therein for enabling the customer to communicate to the employee within the building, a speaker compartment having a speaker disposed therein for enabling the customer to receive communications from the employee within the building, and isolation means to separate acoustically said microphone compartment and said speaker compartment;

said speaker compartment having a front opening for helping to direct sounds from the speaker towards the customer;

said isolation means including a front wall having a baffle mounted thereto extending downwardly to partially obstructed said frontal opening for helping to direct sounds from the speaker downwardly and away from the microphone;

said speaker compartment having a bottom wall recessed from said frontal opening for enabling sounds from the speaker to be directed downwardly towards the drive-up lane;

means for mounting said speaker inclined downwardly at an angle θ relative to the vertical for directing sounds from the speaker downwardly towards the drive-up lane; and electrically connective means to connect said fixed remote communication means to said base station transceiving means.

2. A drive-up station full duplex communication system for communications between an employee within a building and a customer seated within a vehicle at a drive-up customer speaker post outside of the building, comprising:

employee transceiving means for transmitting a first audio signal and for receiving a second audio signal, said means including a headset unit;

base station transceiving means to receive said first audio signal and a third audio signal and to transmit said second audio signal and a fourth audio signal;

audio gain reduction means for decreasing said second audio signal including amplifying means, detector means coupled to said amplifying means to detect characteristics of said fourth audio signal, and attenuator means connected to an output of said detector means and coupled to said third audio signal to alter the strength of said third audio signal;

fixed remote speaker post for transmitting said third audio signal and for receiving said fourth audio signal, including a communications enclosure having a microphone compartment with a frontal opening, a microphone mounted within said microphone compartment, sound absorbing means located behind said microphone, mechanical dampening means to attach said microphone within said microphone enclosure, a speaker compartment, a speaker mounted within said speaker compartment inclined downwardly at an angle from vertical of between about 20° and about 40°, sound absorbent means located behind said speaker, an acoustical dampening means disposed between said microphone compartment and said speaker compartment, a baffle means extending down from said acoustical dampening means to partially obstruct said speaker compartment, and a mounting means to elevate said enclosure above ground level; and electrically connective means to relay said third audio signal and said fourth audio signal between said base station transceiving means and said fixed remote communication means.

3. A drive-up station full duplex communication system for communications between an employee and a customer comprising:

remote transceiving means for transmitting a first audio signal and for receiving a second audio signal, said means including a headset unit;

base station transceiving means for receiving said first audio signal and a third audio signal, and for transmitting said second audio signal and a fourth audio signal;

audio gain reduction means to decrease said second audio signal, including amplifying means, detector means coupled to said amplifying means to detect characteristics of said fourth audio signal, and attenuator means coupled to an output of said detector means and coupled to said third audio signal to alter the strength of said third audio signal;

fixed remote speaker post for transmitting said third audio signal and for receiving said fourth audio signal, including a communications enclosure having a microphone compartment with a frontal opening, a microphone mounted within said microphone compartment, sound absorbing means located behind said microphone, mechanical dampening means to attach said microphone within said microphone enclosure, a speaker compartment, a speaker mounted within said speaker compartment, a speaker mounted within said speaker compartment inclined downwardly at an angle from vertical of between about 20° and about 40°, sound absorbent means located behind said speaker, a dampening compartment interposed between said microphone compartment and said speaker compartment, sound absorbent means located within said dampening compartment, and a baffle mounted to said dampening compartment to partially obstruct said speaker compartment;

a post or menu board supporting from the ground said communications enclosure and secured in the ground to elevate said communications enclosure, raising said speaker to a level between 3 and about 4½ feet above ground level;

electrical cables to relay said third audio signal and said fourth audio signal between said base station transceiving means and said fixed remote speaker post.

4. A drive-up station full duplex communication system according to claim 3, wherein said first and second audio signals are transmitted and received by radio communication means.

5. A drive-up station full duplex communication system according to claim 4, wherein said first audio signal is transmitted and received on a first radio frequency and said second audio signal is transmitted and received on a second radio frequency.

6. A drive-up station full duplex communication system according to claim 3, wherein said first and second audio signals are transmitted and received by optical communication means.

7. A drive-up station full duplex communication system according to claim 6, wherein said first and second audio signals are transmitted and received on one optical wavelength.

8. A drive-up station full duplex communication system according to claim 3, wherein said speaker is elevated at about 4 feet above ground level.

9. A drive-up station full duplex communication system according to claim 3, wherein said microphone is mounted within said microphone compartment in a recessed manner within said frontal opening, at an angle normal to ground level, forming an obtuse angle of about 105° with said speaker.

10. A drive-up station full duplex communication system according to claim 3, wherein said microphone is mounted at said frontal opening at an angle of about 15° from vertical, forming an obtuse angle of about 225° with said speaker.

11. A method of using a drive-up station full duplex communication system for communications between an employee within a building and a customer seated within a vehicle at a drive-up customer station outside of the building, comprising:

transmitting a first audio signal and receiving a second audio signal from a remote transceiver unit;

receiving said first audio signal and a third audio signal and transmitting said second audio signal and a fourth audio signal from a base station transceiver;

sampling said fourth audio signal, detecting characteristics of said fourth audio signal, and attenuating the strength of said third audio signal;

receiving said third audio signal from and transmitting said fourth audio signal to fixed remote communications enclosure having a microphone compartment, a speaker compartment, and an acoustical dampening means disposed between said microphone compartment and said speaker compartment;

recessing a microphone within said microphone enclosure and securing said microphone with mechanical dampening means;

mounting a speaker within said speaker enclosure inclined downwardly at an angle from vertical of between about 20° and about 40°;

partially obstructing said speaker with a baffle;

elevating said fixed remote communications unit above ground;

relaying said third audio signal and said fourth audio signal between said base station transceiving unit and said fixed remote communication enclosure.

12. A drive-up station full duplex communication system for facilitating audible communications between an employee of a business positioned within a building having a vertical wall mounting a drive-up window, and having a customer speaker post station disposed at a drive-up lane outside the building opposite the window, comprising:

an employee transceiver unit disposed within the building to enable an employee to communicate with a customer seat within a vehicle parked in a lane at customer speaker post station;

a customer speaker post disposed at the drive-up station for enabling the customer to communicate with the employee transceiver unit within the building to permit communications to occur to facilitate entering into a transaction;

means for attenuating incoming audio signals at the employee transducer unit when it is transmitting an outgoing audio signal to the customer speaker post to reduce substantially feedback interference; and means for attenuating feedback interference at the customer speaker post when it is transmitting an outgoing audio signal to the employee transceiver unit to reduce substantially feedback interference.

13. A drive-up station full duplex communication system for facilitating audible communications between an employee within a building having a vertical wall with a drive-up window, and a customer positioned in a motor vehicle in a drive-up lane outside the building substantially opposite the window, comprising:

an employee transceiver unit disposed within the building to enable an employee to communicate with the customer within said vehicle when it is opposite to the drive-up window;

customer speaker post means disposed at the drive-up lane for facilitating communications between the customer within the vehicle and the employee within the building;

means for attenuating incoming audio signals at the employee transceiver unit when it is transmitting an outgoing audio signal to said customer speaker post means to reduce substantially feedback interference;

means for attenuating incoming audio signals at said customer speaker post means when it is transmitting an outgoing audio signal to the employee transceiver unit to reduce substantially feedback interference;

wherein said customer speaker post means includes a microphone and a speaker, and wherein said means for attenuating incoming audio signals at the customer speaker post means includes means for mounting said speaker in a downward inclined position with its principal axis of radiation being disposed at an angle of between about 20° and about 40° from the vertical to direct audible signals at the lane away from the vehicle to substantially decrease unwanted feedback interference during communications using both the speaker and the microphone substantially simultaneously.

14. A drive-up station full duplex communication system according to claim 13, wherein said angle is between about 25° and about 35°.

15. A drive-up station full duplex communication system according to claim 14, wherein said angle is about 30°.

16. A method according to claim 13, wherein said angle is between about 25° and 35°.

17. A method according to claim 16, wherein said angle is about 30°.

18. A method of drive-up station full duplex communication between an employee of a business positioned within a building having a vertical wall with a drive-up window, and a customer in a motor vehicle disposed at a speaker post station adjacent to a drive-up land outside the building opposite the window, comprising:

enabling the employee to communicate with the customer at the speaker post station via an employee transceiver unit;

enabling the customer to communicate with the employee within the building via a customer transceiver unit disposed at the speaker post station;

attenuating incoming audio signals at the employee transceiver unit when it is transmitting an outgoing audio signal to the customer transceiver unit to reduce substantially feedback interference;

attenuating incoming audio signals at the customer transceiver unit when it is transmitting an outgoing audio signal to the employee transceiver unit to reduce substantially feedback interference;

wherein the customer transceiver unit includes a microphone and a speaker, said speaker having a principal axis of radiation and being mounted in a downwardly inclined position relative to said microphone with its principal axis of radiation being disposed at an angle of between about 20° and about 40° from the vertical directing the audible signals from said speaker at the drive-up lane away from the vehicle to substantially eliminate unwanted feedback to the microphone during simultaneous communications using both the speaker and the microphone.

19. A full duplex communication system to facilitate audible communication between an employee within a building having a drive-up window and a customer seated in a motor vehicle disposed at a drive-up station in a drive-up lane outside the building substantially opposite the drive-up window, comprising:

an employee transceiver unit disposed within the building to enable the employee to communicate with the customer at the drive-up station;

microphone means disposed at the drive-up station for enabling the customer to transmit an outgoing audio signal to the employee;

speaker means disposed at the drive-up station for enabling the customer to receive an incoming audio signal from the employee, said speaker means having a cone of radiation with a focal point P for emanating acoustical sounds therefrom along a principal outbound audio axis;

housing means disposed at the drive-up station to help acoustically isolate said microphone means and said speaker means from one another;

means for mounting said speaker means within said housing means in a downwardly inclined position with said principal outbound audio axis disposed at an angle $\theta$ from the vertical to direct audible signals at the drive up land away from the vehicle to substantially eliminate unwanted audio feedback to said microphone means during substantially simultaneously employee and customer communications;

speaker post means for supporting said housing means above the ground a sufficient distance D to enable said microphone means to sufficiently receive audible communications from the customer and for spacing said housing means from the drive-up lane a sufficient distance H so that the principal outbound audio axis of said speaker means intersects the ground disposed in said drive-up lane at a horizontal distance L from an imaginary line extending downwardly from the focal point P intersecting the ground at said speaker post means at about an angle $\gamma$;

whereby the greatest concentration of sound from said speaker means contained in said cone of radiation is directed toward the ground disposed between said speaker post means and said drive-up land and not the vehicle to substantially reduce audio feedback into said microphone means.

20. A full duplex communication system according to claim 19, wherein said angle $\theta$ is between about 20 degrees and 40 degrees.

21. A full duplex communication system according to claim 20, wherein a more preferred angle $\theta$ is between about 25 degrees and about 35 degrees.

22. A full duplex communication system according to claim 21, wherein the most preferred angle $\theta$ is about 30 degrees.

23. A full duplex communication system according to claim 22, wherein said angle $\gamma$ is about 90 degrees.

24. A full duplex communication system according to claim 23, wherein said angle $\theta$ is defined by:

angle $\theta$ = 120 degrees − angle $\gamma$.

25. A full duplex communication system according to claim 19, wherein the distance L is between about 2 feet and about 5 feet.

26. A full duplex communication system according to claim 25, wherein a more preferred distance L is between about 3 feet and about 4 feet.

27. A full duplex communication system according to claim 26, wherein the most preferred distance L is about 3.5 feet.

* * * * *

UNITED STATES PATENT AND TRADEMARK OFFICE
CERTIFICATE OF CORRECTION

Page 1 of 2

PATENT NO. : 5,321,848
DATED : June 14, 1994
INVENTOR(S) : Miyahira et al.

It is certified that error appears in the above-indentified patent and that said Letters Patent is hereby corrected as shown below:

Item 56, line 5, delete "Beacker", and substitute therefor --Becker--.

Column 4, line 46, after "communications", insert --from the transceiver unit 50 can be coupled to the speaker--.

Column 6, line 10, before "audio", delete "4".

Column 10, line 14, delete "front", and substitute therefor --frontal--.

Column 12, line 60, delete "seat", and substitute therefor --seated--.

Column 12, line 68, delete "transducer", and substitute therefor --transceiver--.

Column 13, line 57, delete "land" and substitute therefor --lane--.

UNITED STATES PATENT AND TRADEMARK OFFICE
CERTIFICATE OF CORRECTION

PATENT NO. : 5,321,848
DATED : June 14, 1994
INVENTOR(S) : Miyahira et al.

It is certified that error appears in the above-indentified patent and that said Letters Patent is hereby corrected as shown below:

Column 14, line 43, delete "land", and substitute therefor --lane--.

Column 14, line 64, delete "land" and substitute therefor --lane--.

Signed and Sealed this

Twenty-second Day of November, 1994

Attest:

BRUCE LEHMAN

Attesting Officer     Commissioner of Patents and Trademarks